March 23, 1954
R. J. SCHRADER ET AL
2,673,221
PROCESS OF PRODUCING ETHYL ALCOHOL
BY HYDRATION OF ETHYLENE
Filed Jan. 18, 1952
2 Sheets-Sheet 1
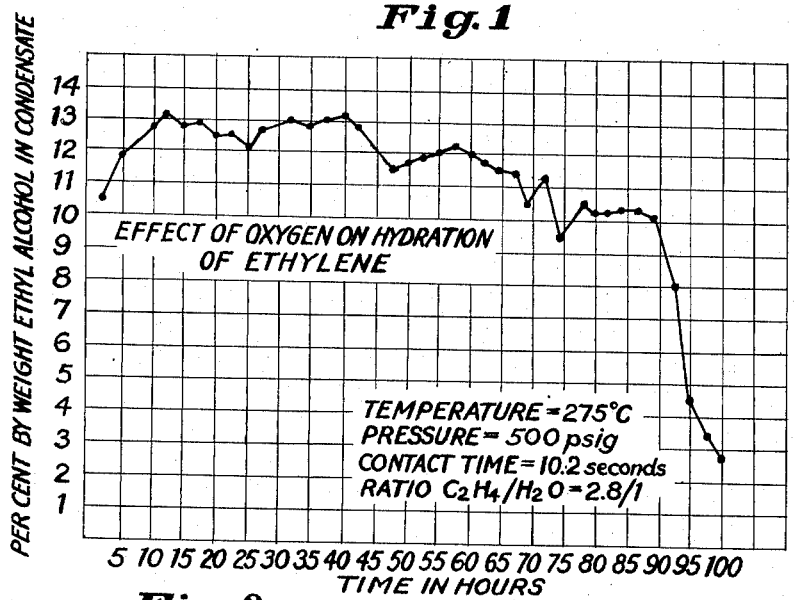
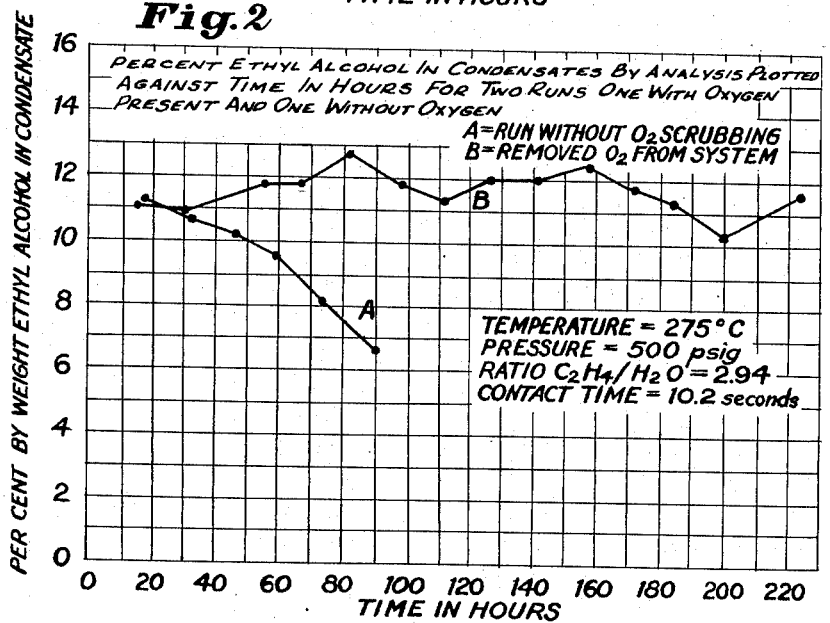
Robert J. Schrader
Howard S. Young
Harry I. Berntsen
INVENTORS
BY
ATTORNEYS

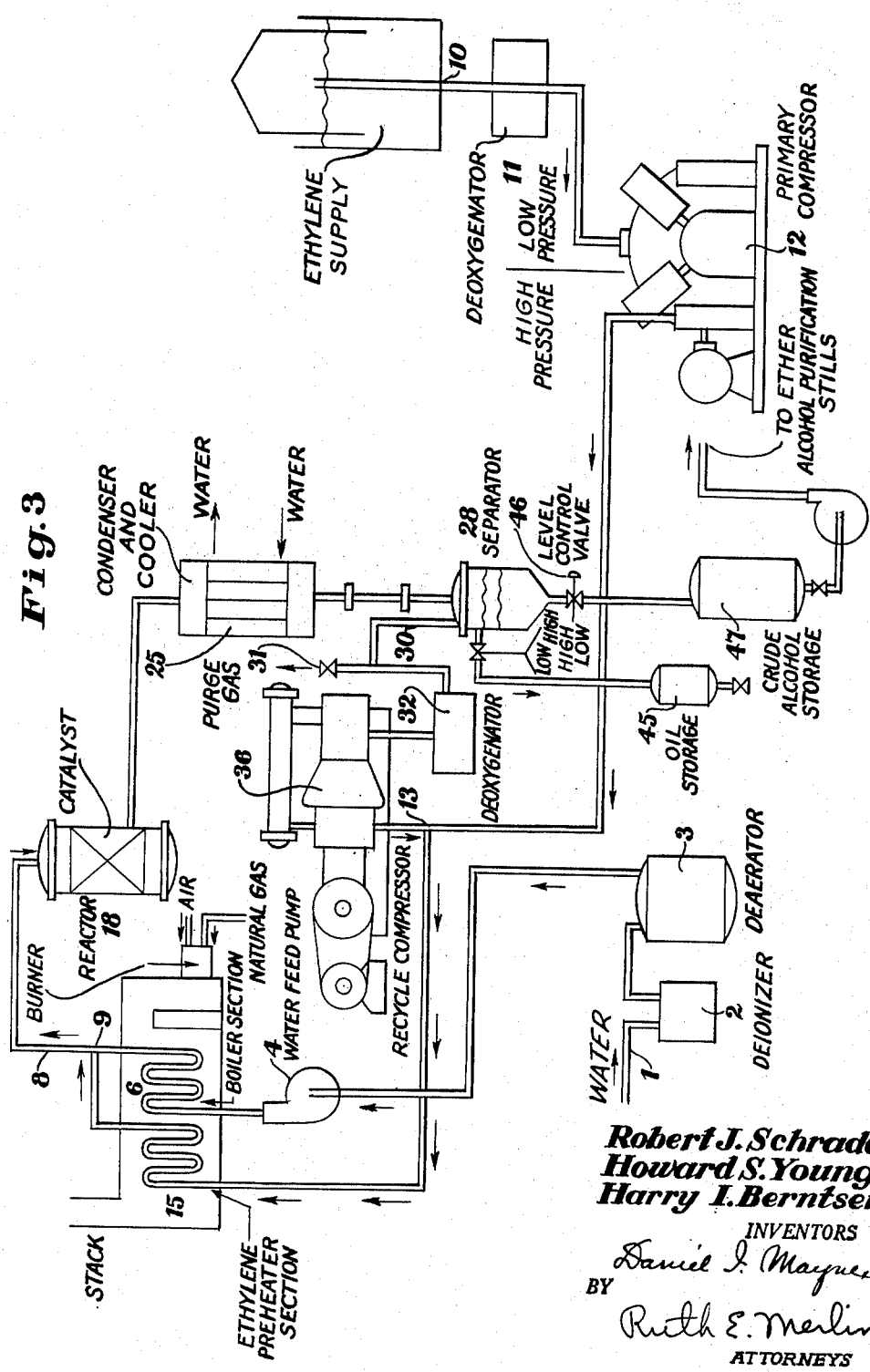

Patented Mar. 23, 1954

2,673,221

UNITED STATES PATENT OFFICE 2,673,221

PROCESS OF PRODUCING ETHYL ALCOHOL BY HYDRATION OF ETHYLENE

Robert J. Schrader and Howard S. Young, Kingsport, and Harry I. Berntsen, Fordtown, Tenn., assignors to Eastman Kodak Company, Rochester, N. Y., a corporation of New Jersey Application January 18, 1952, Serial No. 267,068

5 Claims. (Cl. 260—641)

This invention relates to a process for the hydration of ethylene in the presence of a hydration catalyst, particularly a supported phosphoric acid catalyst, to produce ethyl alcohol. More particularly, it relates to an improvement in such a process, whereby the catalyst life is prolonged and the yield and the conversion of ethylene to ethyl alcohol are improved.

It is known to produce ethyl alcohol by passing ethylene in admixture with suitable proportions of steam into intimate contact with a supported phosphoric acid catalyst at elevated temperature and pressure, removing the alcohol formed and the unreacted steam from the effluent gases, and recycling the unreacted ethylene, together with makeup ethylene and steam, into contact with the catalyst.

We have found that in such a process, the catalyst life is prolonged and the yield and the conversion of ethylene to ethyl alcohol are improved by reducing the oxygen content of the reactants to a very low level prior to passing them over the catalyst. Fairly extensive work with phosphoric acid catalysts supported on diatomaceous earth in the process outlined above gave erratic results until free oxygen was removed from the system. When this was done, reproducible runs could be made, the conversion per pass was increased, and the activity of the catalyst remained high for long periods of time. In a month-long run, the catalyst activity was somewhat higher at the end of the month than at the start of the run. The crude product produced contained between 11 and 14% ethyl alcohol by weight. During this run the oxygen concentration was maintained at less than 0.02% oxygen. Impure ethylene may be used as starting material, and inert gaseous impurities may be allowed to concentrate to a high level in the system, provided that the free oxygen content is kept very low.

In the catalytic hydration of ethylene in the vapor phase, only very low conversion of ethylene to ethyl alcohol is obtained on a single pass of a mixture of ethylene and steam through a catalyst bed. For instance, when a molar ratio of ethylene to steam of three to one is used, the conversion of the ethylene amounts to about 1% to 3% in commercial practice, depending upon reaction conditions. This may vary when other ratios are employed. The usual commercial operation of a process with a low conversion calls for the separation of products and the recycle of reactants. In the case of the hydration of ethylene, the oxygenated products, mainly ethyl alcohol with some ethyl ether, can readily be separated, under reaction pressure if desired, by condensation along with the steam. The ethylene is then recycled, makeup ethylene and steam being added as required.

In the employment of such a cyclic process, the gaseous impurities originally present in the ethylene or water recycle with the ethylene, and build up as the ethylene is used up. This amounts to a continuous dilution of the gaseous reactant stream with impurities. To maintain a constant reaction rate, it is desirable to remove a certain portion of the reaction stream, separate the impurities and return the purified ethylene to the system. The other alternative is to allow the impurities to build up to a given concentration and then purge the whole system, starting anew with fresh ethylene.

In the hydration of ethylene, a cyclic process can be operated at a very high level of inert gaseous impurities. For this reason, the ethylene used as an initial reactant need not be very pure. For this reason also, it is unnecessary to separate and re-purify a large proportion of the ethylene from the cyclic process on each pass. The desirability of operating at a high level of impurities is readily evident. For example, if the cyclic process operates using as a feed material 95% ethylene and 5% impurities, with an impurity level of 40% in the recycled gas, then at steady state (i. e., with the impurity level held constant), for every 100 moles of 95% ethylene introduced into the cycle, 5 mols of impurities and 7.5 moles of ethylene are removed from the system, giving an overall utilization of ethylene of about 92.1%. Operating at an impurity level of 60%, the utilization of ethylene in the system is about 96%, whereas with an impurity level of only 20%, the ethylene utilization in the system is about 79%. Of course, the ethylene withdrawn from the system may be repurified and concentrated and returned to the system. The purification may involve fractionation, absorption, adsorption or some other method. Generally, these procedures are relatively expensive. On the other hand, operating with impurities present in the gas stream requires higher operating pressure for a given rate of reaction (in order to maintain the partial pressures of reactants), and also requires additional expenditure for pumping the impurities around the cycle. This cost must be balanced against the cost of repurification of withdrawn ethylene to determine the level at which the purity of the recycled gases must be maintained for most economical operation.

The use of impure ethylene as an initial reactant is desirable from a cost standpoint. Generally we have found the main impurities present in ethylene derived from petroleum sources comprise other olefins, saturated aliphatic hydrocarbons, carbon dioxide, carbon monoxide, nitrogen and oxygen. For example, a typical analysis for ethylene is 95.2% ethylene, 0.6% ethane, 3.0% methane, 0.3% carbon dioxide, 0.5% carbon monoxide, 0.2% nitrogen, and 0.2% oxygen. Of course, the relative percentages of impurities may vary from batch to batch, or the inpurity content may be higher or lower depending upon the source and the concentration procedure used. This impure ethylene has a long range effect on the catalyst: that is, passing a stream of such ethylene with steam over a hydration catalyst, such as a supported phosphoric acid catalyst at elevated temperatures, such as 200–300° C., slowly deactivates the catalyst. Using a cyclic process, and building up to 20–40% gaseous impurities in the cycle with an ethylene of the above analysis, we have found that generally the catalyst will deactivate completely or be reduced to a very low level of activity in a very short time.

We have found that if we remove the uncombined oxygen from all the gases which are to come in contact with the catalyst, we can operate at a high level of impurities in the cycle for very long periods of time without adversely affecting the activity of the catalyst. To provide steam free from uncombined oxygen, the water used as a reactant is deaerated to a very low level, e. g., 1.0 part per million of oxygen, or even less, by any standard oxygen-removal process used for deaerating boiler feed water, e. g., by a standard vacuum deaerator, by treatment with iron or with sodium sulfite, or by ion exchange procedures. Commercial deaerators and deoxygenators for water are discussed in Uhlig, "Corrosion Handbook," John Wiley & Sons, Inc., New York, N. Y., 1948, pp. 506–510.

The ethylene supply may contain as high as 0.5% or more free oxygen. It may be deoxygenated by passing the ethylene through a catalyst bed of copper, cobalt, platinum, palladium or some other metal, or their reduced oxides. A copper catalyst such as that described in U. S. Patent 2,475,965 has been employed to advantage at temperatures of 50° to 250° C. The catalyst may be supported on asbestos or some other suitable carrier (see U. S. Patent 2,351,167). Generally about 60–75% of the oxygen is removed from the ethylene by using these catalysts, but the oxygen can be removed to almost any low value by proper operation. At the same time the recycled ethylene gas stream may be continuously or periodically deoxygenated to a very low level by similar means. If copper is used to remove the oxygen, the initial feed ethylene is generally reduced to an oxygen concentration of 0.2% or less before it is fed into the cycle. Another method of operation is to admix the fresh feed ethylene with the recycle ethylene prior to passing the recycle ethylene through the deoxygenator. Since the fresh feed ethylene may amount to only about 1 to 3% of the total ethylene in the system, the oxygen concentration in the system is increased by only a small amount by the addition of the makeup ethylene. In this latter method of operation, with an ethylene feed of about 0.5% oxygen concentration and a deoxygenator which separates about 60% of the oxygen, and operating at 40% impurities in the gas stream, we obtain on the order of 70 parts per million of oxygen in the cycle. By removing more oxygen from the starting material by deoxygenating it before introducing it into the cycle, we can reduce this value of average oxygen concentration still further.

We have found that it is desirable to keep the oxygen concentration at 0.1% or less in the recycle gas stream. Concentrations of 0.2 to 0.4% oxygen have a long range effect on the catalyst; that is, deactivate the catalyst slowly over a period of days or weeks. Oxygen concentrations of 2 to 4% of the recycling gas may deactivate the catalyst immediately. We have found this to be the case when operating in a batch manner. If we pass fresh ethylene with a concentration of 0.2 to 0.4% oxygen over the catalyst in the presence of steam to produce ethanol, the per cent conversion of the reactants to ethanol slowly decreases. Higher percentages of oxygen in the gas stream may deactivate the catalyst immediately.

In most of our research work we have operated at temperatures of 225° to 325° C., and volumetric ratios of ethylene to water in the gas phase of from 1:3 to 3:1, with a contact time over the catalyst of from about 3 seconds to 1 minute.

Generally we have found that the higher the ethylene to steam ratio, the more pronounced the effect of oxygen on the catalyst, and the higher the operational pressure, the lower the tolerable concentration of oxygen. Operating in excess of 1000 lbs. per square inch gauge calculated on the basis of the partial pressure of the reactants only, and operating with molar ratios of ethylene to steam at greater than one, we have found that oxygen in the recycling gases of 0.2% or even lower has a long range effect on the activity of the hydration catalysts.

It is possible to operate according to our improved process by originally removing the oxygen from the cycle to a very low level. For example, if the feed ethylene contains only 0.006% oxygen, with a total impurity value of 5%, the oxygen concentration of the recycle gases, operating at a 40% impurity level, would be 0.048%. Generally, however, we prefer to introduce a deoxygenator in the recycling system so that, operating at the pressure of the system, we can remove the oxygen from the recycling gases without withdrawing the ethylene from the system. The operation can be either continuous or intermittent.

The invention will be further described in connection with Figure 3, which illustrates a preferred apparatus arrangement for carrying out the invention. In this arrangement, provision is made for recycling the ethylene while maintaining it under high pressure, and for supplying additional ethylene as required, to make up for that converted into alcohol and for that which is withdrawn from the cycle to maintain the desired concentration of ethylene in the recycling gas stream.

The feed ethylene to the cyclic system enters at 10 and the oxygen is removed from this stream by means of deoxygenator 11. The ethylene is compressed by means of pump 12 to the desired pressure, and introduced into the recycle ethylene gas stream at 13. The recycle gas stream passes through ethylene preheater 15 prior to mixing with hot steam at 9.

The steam is produced in the following manner: Water enters in pipe 1 and passes through deionizer 2, into deaerator 3, where the oxygen is removed. Hot water issues from the deaerator and is pumped by pump 4 into boiler 6, where it is converted into steam and heated to the desired temperature prior to mixing with the ethylene in line 8 at junction 9.

The hot steam and hot ethylene gas stream pass through line 8 into the hydration reactor 18 which contains the catalyst for the hydration reaction. The hydration reactor may be heated or cooled to maintain it at the desired temperature in the range of 225–325° C., but with proper regulation of the temperature of the entering gases and suitable insulation of the reactor, provision for heating or cooling may be unnecessary.

The mixture of steam and ethylene passes through the catalyst bed in the reactor, where a portion of the ethylene and water react to form ethyl alcohol. Small amounts of diethyl ether and polyethylene oil are also formed. The mixture of gases leaves the reactor 18 and passes through a condenser cooler 25 in which steam and ethyl alcohol are condensed from the unreacted ethylene. This mixture passes to a separator 28 where the liquid is separated from the unreacted ethylene. The gas stream from the separator then passes back through the pipe 30 and deoxygenator 32 to the suction side of the recycle compressor 36. The liquid collected in the separator 28 divides into an oil layer and a water layer. The oil layer is drawn off to an oil storage tank 45, and the crude product passes through a level control valve 46 to the crude ethyl alcohol storage tank 47. From this tank the crude mixture is pumped to purification stills where pure alcohol and diethyl ether are obtained.

Since the ethylene feed contains some inert gases, these will build up in the system. The ratio of ethylene to inert gases in the recirculating gas stream can be maintained at any desired level by continuously or periodically withdrawing a portion of the recycled gas from the system through the purge gas line 31. This purge gas will normally be treated to recover its ethylene content.

If the feed ethylene is deoxygenated to a suitably low value by deoxygenator 11, deoxygenator 32 can be eliminated from the system. On the other hand, if the oxygen content of the feed ethylene is low, deoxygenator 11 can be eliminated. In this case, the feed ethylene is more advantageously introduced into the system by way of pipe 30, through which the recycle gas stream flows, at a point downstream from the purge line 31 and upstream from deoxygenator 32.

By way of illustrating our invention, we give the following examples:

Example 1

In an apparatus and process of the type described above, ethylene and water in a molar ratio of 3 to 1, at a temperature of 275° C., were reacted in the presence of a catalyst composed of phosphoric acid deposited on diatomaceous earth. The catalyst contained 80–85% by weight of phosphoric acid. The space velocity, i. e., the volume of gas at reaction conditions passed per hour for each bulk volume of catalyst, was 360 catalyst volumes per hour. The process was operated in a cyclic fashion until the level of gaseous impurities had reached 40%. At the end of each cycle, the steam and ethanol produced were condensed and continuously removed from the system, while the ethylene was recycled. A palladium catalyst was used in a deoxygenator unit inserted in the return line so that the recycled gas along with makeup ethylene were deoxygenated when it was necessary. The pressure on the system was held at about 52 to 53 atmospheres. After the gaseous impurities had built up to 40% of the gas stream, gaseous materials were continually removed from the cyclic system to maintain the gaseous impurities at about 40% in the circulating gases. The water used was deaerated to a value of 1 to 2 p. p. m. of oxygen. With an ethylene feed of oxygen content 0.2% and total impurities content of 5.2%, the cyclic process was operated in such a manner that the oxygen concentration of the gases passing over the catalyst was never more than 0.07%. At the outset, the alcohol concentration of the condensate removed from the system was 11.5% by weight, and at the end of one month, the alcohol concentration in the products removed was 13.4%, indicating a slight increase in catalyst activity.

Under the same conditions, with an average oxygen concentration in the recycled gas of 0.2 to 0.3%, the alcohol concentration of the products removed at the beginning was 10.0% by weight, while at the end of two weeks, the alcohol concentration in the products was about 8.3%, and at the end of one month of operation the alcohol concentration had dropped to 6.1%, indicating a continuous decrease in catalyst activity.

Where no deoxygenation of any component of the system was used at all, the oxygen concentration of the cyclic system rose to a fairly constant level of about 1.6 to 1.7%. At the outset, the concentration of alcohol in the products amounted to 4.0%; at the end of 2 days' operation this value had dropped to 2.8% by weight.

The products removed in all cases in this example consisted of water, ethanol, and small amounts of ethyl ether and polyethylene oils. Minor impurities such as a small amount of dissolved ethylene and other gases were not separately analyzed.

Example 2

With a catalyst of the type used in Example 1, a cyclic process was employed using ethylene of 90% purity, containing 0.4% oxygen, and using water of an oxygen content of less than 1 p. p. m. The process was operated at an impurity level of 30% in the recycling gas, under 575 p. s. i. g. pressure, at a temperature of 275° C. with a feed molar ratio of ethylene to water of 1 to 2.59. The space velocity used was 124 catalyst volumes per hour at reaction conditions. The products and unreacted steam were continuously withdrawn from the system and unreacted ethylene was recycled. Enough of the recycled gases was continuously removed from the system to maintain the impurity level at 30%. A deoxygenator was placed in the cyclic system to maintain the desired oxygen concentration. When the system was operated at an oxygen concentration in the recycled gas of .05% or less, there was no appreciable change in catalyst activity over the course of ten days. At the start, the alcohol concentration in the aqueous product withdrawn was 5.1% by weight. At the end of ten days the average alcohol concentration was 5.3% by weight. On the other hand, when operating with 30% gaseous impurities in the recycled gas when no provision for oxygen removal from gas or water was made, the catalyst showed no activity at all after five days of operation. The oxygen concentration in the recycling gas stream under these conditions was about 1.2%.

*Example 3*

A cyclic hydration process was operated in a manner similar to Example 1 at an impurity level of 15% in the recycling gases. The catalyst used was similar to that described in Example 1. The operating conditions were: temperature, 275° C.; pressure, 1200 to 1250 p. s. i. g.; molar ratio of ethylene to steam, 3 to 1; space velocity, 270 catalyst volumes per hour at reaction conditions; and oxygen concentration in the reactant water, 0.6 p. p. m. The ethylene had an analysis of 98.1% ethylene, 1.3% methane and ethane, 0.2% carbon dioxide, 0.2% carbon monoxide, 0.1% nitrogen and 0.1% oxygen. When the oxygen in the recycle gas was held at less than 0.005%, the ethanol concentration of the steam condensate amounted to 16.2%. After ten days of operation this value was 16.4%. On the other hand, when the oxygen level in the recycle gas was allowed to reach 0.6%, the catalyst deactivated rapidly to give a concentration of only 2.7% alcohol in the condensate after 24 hours of operation. After two days' operation, no alcohol was produced at all.

*Example 4*

In Figure 1 are shown the results of a run using a phosphoric acid—diatomaceous earth catalyst of 80–85% phosphoric acid content. This run was carried out at a temperature of 275° C., a pressure of 500 p. s. i. g., with a mol ratio of ethylene to steam of 2.8, and a contact time over the catalyst of 10.2 sec. In the figure, per cent by weight of ethyl alcohol in the condensate is shown on the ordinates, and time in hours on the abscissae. The oxygen content of the feed ethylene was 0.3%, and for the first 89 hours the oxygen content of the recycle gases was 0.2%. At the end of that time ethylene containing 3.8% oxygen was fed to the system. The oxygen content of the system rose sharply and resulted in a rapid decrease in catalyst activity.

*Example 5*

Figure 2 gives a comparison of two runs which were identical except that in run A no facilities were used to prevent build-up of oxygen in the system, whereas in run B the oxygen concentration in the system was held below 0.1% by volume. The catalyst used was phosphoric acid supported on diatomaceous earth, of 80 to 85% phosphoric acid content; the temperature was 275° C., the pressure was 500 p. s. i. g., the mol ratio of ethylene to steam was 2.94, and the contact time over the catalyst was 10.2 seconds. The oxygen content of the ethylene feed was 0.3%. In run A, in which no deoxygenation was carried out, the per cent by weight of ethyl alcohol in the condensate was 11% at the end of 15 hours, and dropped steadily to a value of 6.7% at the end of 90 hours. In run B, in which the oxygen concentration in the system was held below 0.1% by volume, the percent by weight of ethyl alcohol in the condensate, which was likewise 11% at the end of 15 hours, varied between 10.5% and 12.5% during the next 205 hours, and at the end of 220 hours was still 11.5%.

*Example 6*

A cyclic hydration process was operated in a manner similar to Example 1 at an impurity level of 25 per cent in the recycling gases. The catalyst used was prepared according to suggestions made by Applebey, Glass and Horsley ("J. Soc. Chem. Ind.," 56, 279T (1937)), and consisted of cadmium metaphosphate. The operating conditions were: temperature 250° C.; pressure, 500 p. s. i. g.; mol ratio of ethylene to steam, 2.87 to 1; space velocity, 93 volumes of gas per volume of catalyst per hour at reaction conditions; and oxygen concentration in the reactant water, 0.4 p. p. m. The ethylene specified in Example 3 was used. The concentration of oxygen in the recycle gas was held below 0.03 per cent and the ethanol concentration of the aqueous product ranged from 12.9 to 13.8 per cent, during one week's operation. When the concentration of oxygen in the recycle gas was deliberately allowed to reach 0.8 per cent during the next 24 hours, the catalyst was almost completely deactivated as shown by the fact that at the end of this 24-hour period, the concentration of ethanol in the aqueous product was only 3.2 per cent.

*Example 7*

A cyclic hydration process was operated in a manner similar to Example 1 until the level of gaseous impurities had reached 50 per cent in the recycling gases. The catalyst used was prepared according to the directions of Stanley, Youell, and Dymock ("J. Soc. Chem. Ind.," 53, 205T (1934) and consisted of a composition which may be referred to as $MnO-0.5\ B_2O_3-3.5\ H_3PO_4$ in the form of 8 to 14 mesh granules. The reactor was operated at 250° C. at a pressure of 500 p. s. i. g. The mol ratio of ethylene to steam was 2.4 to 1 and the contact time was 18.9 seconds. The oxygen concentration in the water fed to the reactor was 0.2 p. p. m. and the oxygen concentration in the recycle gas was held at 1.3 per cent. The activity of the catalyst appeared to be very poor, as the aqueous condensate contained only 2.1 per cent alcohol. When the experiment was repeated and the oxygen content of the recycle gas was held at 0.01 per cent the concentration of alcohol in the aqueous condensate reached 11.7 per cent by weight.

It will be understood that our invention is not limited to the conditions recited in this specification. In the case of a supported phosphoric acid catalyst, the catalyst may contain small amounts of other materials, catalytic or inert, in addition to the phosphoric acid and the support. The catalyst support, and the per cent of phosphoric acid in the catalyst, may be varied. Other hydration catalysts than those shown in the examples may be used. Many hydration catalysts are known in the art. The temperature, pressure, time of contact, space velocity, and ratio of ethylene to steam may be varied. The form and arrangement of the apparatus may be varied.

What we claim as our invention and desire to be secured by Letters Patent of the United States is:

1. A cyclic process for the manufacture of ethyl alcohol by the reaction of ethylene and steam in contact with a hydration catalyst, at elevated temperature and pressure, in the presence of considerable proportions of inert gaseous impurities in the recycling gas stream, which comprises holding the free oxygen content of the gases coming in contact with the catalyst at a value not exceeding about 0.2%.

2. A cyclic process for the manufacture of ethyl alcohol by the reaction of ethylene and steam in contact with a supported phosphoric acid catalyst, at elevated temperature and pressure, in the presence of considerable proportions of inert gaseous impurities in the recycling gas stream, which comprises holding the free oxygen content of the gases coming in contact with the catalyst at a value not exceeding about 0.2%.

3. A cyclic process for the manufacture of ethyl alcohol by the reaction of ethylene and steam in contact with a supported phosphoric acid catalyst, at elevated temperature and pressure, in the presence of considerable proportions of inert gaseous impurities in the recycling gas stream, which comprises holding the free oxygen content of the gases coming in contact with the catalyst at a value not exceeding 0.05% by deaerating the water used to form steam and removing oxygen from the feed ethylene.

4. A cyclic process for the manufacture of ethyl alcohol by the reaction of ethylene and steam in contact with a supported phosphoric acid catalyst, at elevated temperature and pressure, in the presence of considerable proportions of inert gaseous impurities in the recycling gas stream, which comprises holding the free oxygen content of the gases coming in contact with the catalyst at a value not exceeding 0.05% by deaerating the water used to form steam, removing oxygen from the feed ethylene, and removing oxygen from the recycling gas stream.

5. A cyclic process for the manufacture of ethyl alcohol by the reaction of ethylene and steam in contact with a supported phosphoric acid catalyst, at elevated temperature and pressure, in the presence of considerable proportions of inert gaseous impurities in the recycling gas stream, which comprises holding the free oxygen content of the gases coming in contact with the catalyst at a value not exceeding 0.05% by deaerating the water used to form steam and removing oxygen from the recycling gas stream.

ROBERT J. SCHRADER.
HOWARD S. YOUNG.
HARRY I. BERNTSEN.

References Cited in the file of this patent

UNITED STATES PATENTS

| Number | Name | Date |
|---|---|---|
| 2,050,442 | Metzger | Aug. 11, 1936 |
| 2,050,445 | Metzger | Aug. 11, 1936 |
| 2,402,425 | Meier | June 18, 1946 |